US006880447B2

(12) United States Patent
Harth et al.

(10) Patent No.: US 6,880,447 B2
(45) Date of Patent: Apr. 19, 2005

(54) BRAKE FORCE TRANSMISSION DEVICE FOR A BRAKE FORCE AMPLIFIER

(75) Inventors: Ralf Harth, Darmstadt (DE); Holger von Hayn, Bad Vilbel (DE); Wilfried Wagner, Hüttenberg (DE); Wolfgang Ritter, Oberursel/Ts (DE); Hans-Jörg Feigel, Rosbach (DE); Jürgen Faller, Kahl (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 19 days.

(21) Appl. No.: 10/467,575

(22) PCT Filed: Jan. 31, 2002

(86) PCT No.: PCT/EP02/00977

§ 371 (c)(1),
(2), (4) Date: Aug. 8, 2003

(87) PCT Pub. No.: WO02/064411

PCT Pub. Date: Aug. 22, 2002

(65) Prior Publication Data

US 2004/0050245 A1 Mar. 18, 2004

(30) Foreign Application Priority Data

Feb. 15, 2001 (DE) .......................................... 101 07 587
Sep. 11, 2001 (DE) .......................................... 101 44 619

(51) Int. Cl.$^7$ ........................................... B60T 13/573
(52) U.S. Cl. .................................................. 91/369.1
(58) Field of Search ............................ 91/369.1, 369.2, 91/369.3, 376 R

(56) References Cited

U.S. PATENT DOCUMENTS

| | | | |
|---|---|---|---|
| 3,548,595 A | * 12/1970 | Spahn et al. | ............... 91/369.3 |
| 4,319,455 A | * 3/1982 | Schubert | .................... 91/369.2 |
| 4,719,842 A | 1/1988 | Gautier | |
| 5,261,313 A | 11/1993 | Yared | |
| 5,699,713 A | * 12/1997 | Mortimer | .................... 91/369.2 |
| 5,943,937 A | 8/1999 | Endo | |
| 6,192,783 B1 | * 2/2001 | Tobisawa | .................... 91/369.2 |

FOREIGN PATENT DOCUMENTS

| | | |
|---|---|---|
| DE | 199 16 579 A1 | 2/2002 |
| GB | 2 320 948 A | 7/1998 |
| WO | WO 95/01272 | 1/1995 |

OTHER PUBLICATIONS

Patent Abstract of Japan, Publication No. 10230840A dated Sep. 2, 1998, Applicant: Tokico Ltd., Inventor: Endo Mitsuhiro, Ando Hiromi, Amari Yasuhiko.
German Search Report of Application No. 101 44 619.5 dated Sep. 11, 2001.
International Search Report of Application No. PCT/EP02/00977 dated Apr. 15, 2003.

* cited by examiner

*Primary Examiner*—Thomas E. Lazo
(74) *Attorney, Agent, or Firm*—RatnerPrestia

(57) ABSTRACT

The present invention relates to a brake force transmission device for a brake force booster with an elastic reaction element, and input member with an associated effective surface, an output member with an associated effective surface, and a first transmission ratio that is defined by a ratio of the effective surfaces being in operative engagement with the reaction element.

An object of the present invention is to provide means of a simple design, if possible arranged in the form of an assembly, giving the operator of an automotive vehicle increased support when high braking forces are required.

The essence of the invention is the provision of means which starting from a determined pressure prevailing in the reaction element will reduce the reaction force introduced into the input member by a defined amount. The driver is thus given additional support, requiring a proportionately reduced increase in input force for a further increase in output force. It is thus possible for the driver to better proportion the necessarily higher brake forces after the abrupt increase in the ratio of the amplification.

12 Claims, 2 Drawing Sheets

BRAKE FORCE TRANSMISSION DEVICE FOR A BRAKE FORCE AMPLIFIER

TECHNICAL FIELD

The present invention relates to a brake force transmission device for a brake force booster with an elastic reaction element, an input member with an associated effective surface, an output member with an associated effective surface, and with a first transmission ratio defined by a ratio of the effective surfaces being in operative engagement with the reaction element.

BACKGROUND OF THE INVENTION

Japanese utility model Sho 61-205858 e.g. discloses a transmission device of this type. The transmission device comprises a resiliently preloaded, moveable pressure member (38b) arranged on an inlet side (or an outlet side) and causing an abrupt increase of the boosting ratio due to a change of the surface ratio on the inlet side (or on the outlet side), with an input force predetermined.

BRIEF SUMMARY OF THE INVENTION

In view of the above, the present invention is based on a transmission device for the brake force of a brake force booster with an elastic reaction element, an input member acting on the reaction element by way of an input effective surface, and with an output member acting on the reaction element by way of an output effective surface, with at least part of the force exerted on the output effective surface being taken up by a control housing of the brake force booster, and with modification means being provided that modify the force transmission ratio between input member and output member defined by the ratio of the effective surfaces in dependence on the forces exerted on the reaction element by way of the effective surfaces or the deformation of the reaction element caused hereby.

It is an object of the invention to provide a transmission device that has a particularly small overall size and is easy to integrate into a standard type of brake force booster. Consequently, an objective is to permit employing the transmission device as desired also in already existing brake force boosters, without necessitating costly new constructions or modifications.

This object is achieved according to the present invention in that on the input side a part of the surface of the reaction element is supported on the input member by way of a switching ring and by way of a spring element and, with rising force applied to the reaction element, the switching ring is displaced in opposition to the force of the spring element towards a stop on the control housing, makes catch at said and thereby decreases the input effective surface.

Thus the invention principally involves that deformation of the reaction element displaces the switching ring in opposition to the force of the spring towards the input member until the surface of the reaction element reacting on the control housing is increased by the annular surface of the switching ring. The result is a smaller effective surface at the input and, thus, also an increase of the transmission ratio of forces. More specifically, this means that after the switching ring has moved into abutment on the control housing, the reaction of the output member applied to the input member is reduced. Thus, the driver can reach the same braking effect, with a reduced pedal force.

A particularly simple design for the transmission device is achieved in an improvement of the invention in that the spring element is a captivated spring assembly. The spring assembly may have a very simple design, as will be explained in the following. Further, the spring assembly may form a closed construction unit that is integrally inserted into the control housing when the brake force booster is assembled. The same applies to the switching ring that may be connected integrally to the spring assembly, yet forms a separate unit in an advantageous manner. The advantage of these measures in particular resides in the fact that both the spring assembly and the switching ring may be kept on stock in different types, and the control housing may then be equipped with them depending on the requirement and the desired course of boosting.

In a favorable improvement of the invention the spring assembly includes a spring that is compressed with bias between two movable retaining elements which are limited in their maximum distance to each other by a stop. Essentially, the spring assembly may have a symmetrical design. It is only important in this regard that the two retaining elements can be displaced relative to each other in opposition to the force of the spring. Further, the stop element ensures that the two retaining elements are combined in a unit and none of the retaining elements can get lost. Besides, it is possible to clearly define the force with which the two retaining elements are preloaded towards each other by selecting the spring and the distance between the two retaining elements.

In an improvement of the invention the first of the two retaining elements bears against the input member and forms a projection for the input member, which projection can act on the reaction element and further includes a stop that forms the stop element in relation to the second retaining element. Consequently the first retaining element can make catch directly on the reaction element by way of a projection that reaches through the second retaining element. It is, however, also feasible that the first retaining element acts on the reaction element only indirectly by way of a pressure member. This is advantageous inasmuch as the pressure member may be chosen corresponding to the variation of the desired amplification. As it is also possible to select the switching ring that can be inserted separately, as has been explained hereinabove, the combination of the switching ring and a pressure member permits largely varying the course of the characteristic curve of amplification. Thus, the boosting performance of the brake force booster can be adapted to a great extent to the respective requirements by the selection of the switching ring, the pressure member, and the spring element in dependence on the input force. It is also favorable that the mentioned elements may be retrofitted and thus allow an adaptation of the booster already in series production.

A particularly simple possibility of guiding the switching ring within the housing is achieved in that the switching ring is designed as an exchangeable loose component and, preferably, with its inside peripheral surface is guided by an external peripheral surface of the projection and/or with its external peripheral surface is guided by the inside peripheral surface of a radial housing projection of the control housing which accommodates part of the forces exerted by the reaction element axially towards the input side. In this arrangement, the switching ring with its inside surface may be guided both by way of the outside surface of the projection and by way of its outside peripheral surface on the inside peripheral surface of a projection on the control housing. However, only guiding of the switching ring on its outside peripheral surface is possible for the case that the first retaining element makes catch at the reaction element only indirectly by way of a pressure member.

It may be advisable that the switching ring abuts on the control housing and, thus, changes the characteristic curve of amplification. A still simplified construction is achieved in that the forces from the reaction element taken up by the switching ring are transmitted from the second retaining element by way of spring onto the first retaining element until the second retaining element abuts on the control housing. In this arrangement, the switching ring does not abut directly on the control housing but indirectly by way of the second retaining element on which it is acting. This permits a very simple configuration of the switching ring, hence, it is made of a simple cylindrical ring. Further, a large stop surface may be achieved in a very simple fashion by the design because the second retaining element anyway must have a sufficiently large extension in a radial direction for accommodating a sufficiently large spring.

A simplified manufacture is achieved in that the forces directly introduced by the reaction element in the input direction into the control housing are transmitted onto a ring fixed against the control housing in the input direction. Because the fixed ring may additionally be used as a guide for the switching ring, the strength of the switching ring and thus the course of the characteristic curve of the amplification may be influenced by correspondingly dimensioning the inside recess of the fixed ring and the outside diameter of the switching ring.

A further simplification for the design of the transmission device of the invention is achieved in that the second retaining element includes radial second guiding projections that are axially guided in associated second guiding grooves in the control housing, with end wall of the second guiding grooves forming the axial stop in the control housing. The control housing serves for axially guiding the second retaining element and additionally as a stop. Thus, the walls of the guiding grooves are utilized twice because they are used for guiding in a longitudinal direction and as a stop.

To achieve a sufficient degree of spring force despite small dimensions it is advisable that the spring element includes two spiral springs arranged concentrically relative to each other. The spring may influence the course of the characteristic curve of amplification by a corresponding selection of the characteristic curve of the spring. The projection may be integrally connected directly to the first retaining element for example by riveting the projection to the first retaining element. The retaining element may also be riveted to the projection for saving material and for the suitable combination of construction materials.

It is an important aspect for the invention that it is integrated into a controlled brake system in an especially appropriate manner. This applies in particular when in the controlled brake system the distribution of the brake forces to the individual wheels or wheel groups is controlled in dependence on the slip at the respective wheel or the wheels. It is thereby rendered possible with low effort that a sufficiently high amount of brake pressure can be generated even if a driver actuates the brake with a too weak depression of the pedal. On the other hand, the controlled distribution of brake forces ensures that the vehicle will not leave track as a result of slip on one or more wheels.

The advantage of the invention is basically due to the following facts. The present function principle essentially and simply relates to a biased spring that is interposed between the valve piston and the piston in an axial function. Functionally required stops are provided, with a direct transmission being ensured when the booster is operated. The preferred constructive features are as follows: There is provision of a compression spring that is captivated in a straightforward fashion, and a very simply designed spring element is used. The control housing includes a fixed ring that is configured very simply as a disc taking up force. This fixed ring can move to abut on the end surface of a stepped bore in the control housing, with grooves being indented into the wall of the stepped bore that serve for guiding and as a stop at the same time. In other words, the following features are especially important in the construction described herein.

The present function principle is basically and simply related to a preloaded spring that is interposed between the valve piston and the annular piston (switching ring) in an axial function, with some functionally induced stops, with a direct force transmission being ensured during operation. Construction features to be especially emphasized are the straightforwardly captivated compression spring(s), an inexpensive force-transmission member. A control housing area behind the disc taking up forces receives multi-functionally the forces of the switching ring and additionally serves for guiding a stop plate as second retaining element with stop. The stop plate biases the spring, conducts the reaction forces of the annular piston to the spring, represents the stop of the annular piston as well as a transmission member during operation.

The invention is especially efficient in connection with an electronically controlled brake force distribution because in the event of failure of the ABS (anti-lock system) usually also the electronic brake force distribution (EDB) will fail. In this case, the driver can still properly dose the brake pressure in the steep branch of the booster characteristic curve. This is in contrast to systems with a panic braking function such as a brake assistant (BA) or mechanical brake assistant (MBA) which are considerably more difficult to master during change-over to an infinite (steep) characteristic curve of brake force boosting.

DETAILED DESCRIPTION OF THE PREFERRED EMBODIMENTS

Figure 1:
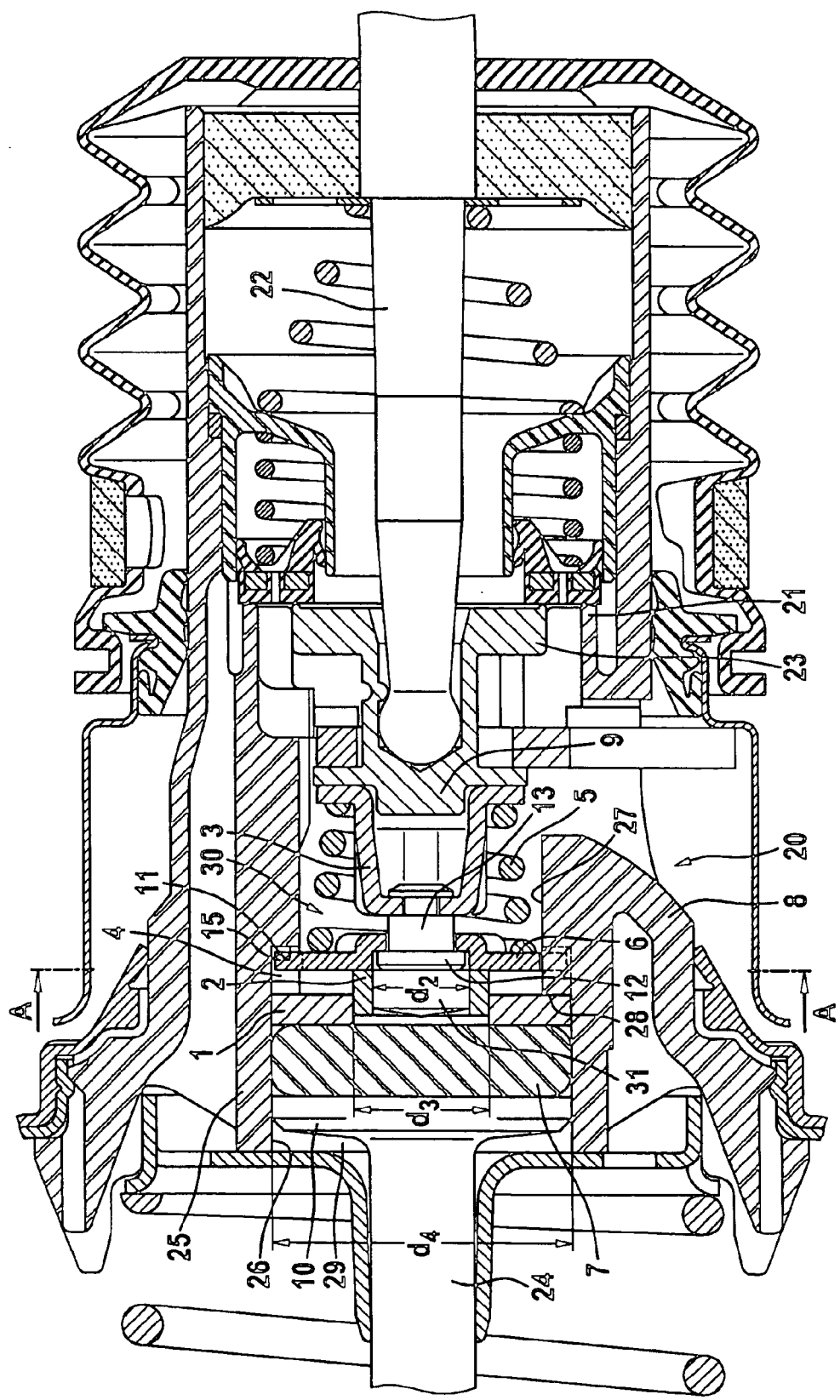
FIG. 1 shows a first embodiment of a transmission device of the invention in cross-section and a broken-out illustration.

The design and the function of the transmission device 1 will be described in detail in the following, and the basic function of a brake force booster as disclosed exemplarily in PCT/EP98/07314 is assumed as being known.

In an idealized view, brake force boosters principally known in the art have a constant transmission ratio over the entire operating range up to the so-called point of maximum boosting, with the produced output force (pedal force and boosting force) rising linearly above the input force (pedal force). In principle, the transmission ratio essentially influencing the pedal feeling of the driver is defined by the ratio of the effective surface d4 associated with the output member to the effective surface d3 associated with the input member. For greater braking effects, that means, at a higher brake force level, it is considered positive to support the driver to a stronger degree. More specifically, a higher transmission ratio is caused, as can be taken e.g. from JP-Sho-61-205858.

In addition to other parts to be assigned to the brake force booster, which do not have any major influence and therefore will not be described in the following, a transmission device 20 of the invention comprises an input member 22 with a valve piston 23, said input member being movably arranged in a control housing 8 with a first sealing seat 21, as well as an output member 24 for actuating a master brake cylinder (not shown). Interposed between the input member 22 and the output member 24 is a preferably disc-shaped elastic element 7 which is made of plastic material or rubber material and is encompassed on all sides by surfaces of parts of the transmission device 20, in other words, is quasi encapsulated between movable walls. When pressurized the elastic reaction element 7 behaves like an incompressible fluid according to the laws of constancy of volume and acts quasi as a mediator between the pedal forces introduced by way of the input member 22 and the brake reaction forces which are fed back from the vehicle brake system to the vehicle operator. Consequently, balanced forces prevail at the reaction element 7 in each position of brake actuation.

The reaction element 7 is seated in a bowl 25 that is open to the left in FIG. 1 and is formed by a first bore 26 in control housing 8 and a fixed ring 1 that is supported at an edge 28 of a second bore 27 of the control housing 8. The bowl has an inlet opening 29, wherein the front end of the output member 24 in the drawing is guided. Said output member 24 at its right-hand end in FIG. 1 passes over into a plate 10 that closes the bowl 25 and bears against the wall of the reaction element 7 that points to the left in FIG. 1. Towards the right hand, the reaction element 7 is supported on the fixed ring 1 which, in turn, abuts on the circumferential edge 28 or step between the first bore 26 and the second bore 27. The surface for the plate 10 is indicated by value d4. The fixed ring 1 has an opening inside that is indicated by the value d3 as area of the opening. In opening d3 a switching ring 2 is guided which is moveable relative to the fixed ring 1 in the longitudinal direction of the booster. A spring element is composed of a first retaining element 3, a second retaining element 6 and a spring 5. Said spring 5 preloads the two retaining elements 3 and 6 in relation to each other so that they can only be displaced against each other with a defined force. The maximum distance of the two retaining elements is determined by a stop 12 that is arranged at a projection 13 of the first retaining element 3.

The first retaining element 3 is furnished with projection 13 which can be configured as one single continuous piece along with the retaining element. However, it is also suitable to design the projection 13 as a rivet part, as illustrated in FIG. 1. To this end, the rivet part may be made of a material with appropriate strength, while the first retaining element 3 is made of a formable metal sheet. At the end of the rivet part 13, stop 12 is provided that is configured as a circumferential nose. It is ensured by this stop that the second retaining element 6 can move only a predetermined distance away from the first retaining element 3. The projection 13 may project until into the interior of the switching ring 2. As in the present embodiment, however, the rivet part 13 may also be succeeded by a pressure member 31, which extends through the switching ring 2 and acts on the reaction element 7.

Figure 2:
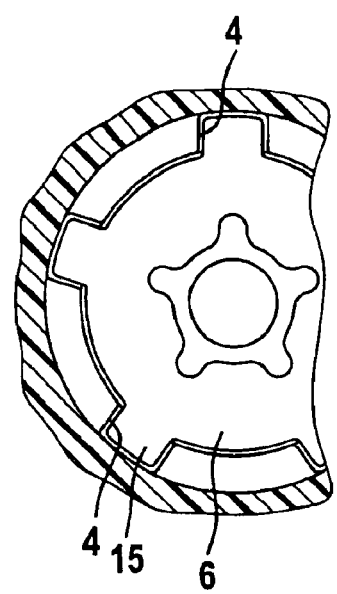
FIG. 2 is a broken-out cross-sectional view of the embodiment of FIG. 1 at the level of the line of intersection A—A in FIG. 1.

Guiding the second retaining element 6 in the control housing 8 is important for the present invention. This guiding arrangement is effected by means of guiding grooves 4 which are machined into the inside peripheral surface of the second bore 27, distributed over the periphery of said bore. For guiding purposes, the second retaining element 6 includes correspondingly designed guiding projections 15 that engage into the grooves 4, as shown in FIG. 2. An end wall 11 in each groove forms a stop for the guiding projections 15 so that when the guiding projections 15 abut on the respective end wall 11, a force directed to the right to the second retaining element 6 in FIG. 1 is taken up by the control housing 8. All other components illustrated in FIG. 1 are not essential for the present invention and will not be described more closely herein.

The mode of operation according to the embodiment of FIG. 1 is as follows. When the input member 22 in FIG. 1 is displaced to the left in the position shown in FIG. 1, the pressure member 31 and the switching ring 2 will make catch at the reaction element 7. This renders a surface d3 active at the reaction element 7, while the reaction element 7 acts with surface d4 towards the output member 24. The ratio of these two surfaces defines the boosting ratio of the booster in this operating condition. The switching ring 2 and pressure member 31 then move together in parallel because the spring 5 is so stiff that it will not yield to the input force acting on the input member 22 in this area.

With rising input force, the force exerted by the output member 24 and acting in the direction of the inlet will increase, with the proportionate force acting on the switching ring 2 rising as well. Said proportionate force finally becomes so high that the second retaining element 6 is lifted from stop 12 by the force applied by the switching ring 2 because the spring 5 starts to give way. Thus, the switching ring 2 displaces in relation to pressure member 31 to the right in FIG. 1. This displacement continues with rising input force until the guiding projections 15 finally come to bear against the associated end wall 11. As this occurs, the spring 5 is compressed and correspondingly shortened. Upon further rise of the input force, the additional forces acting on the switching ring 2 in the direction of the input are only taken up by the end wall 11 and, hence, by the control housing 8. Starting from this time, only surface d2 acts as a reactive force of the reaction element 7 on input member 22. The amplification of the booster dependent on the effective surfaces is thus the result of the ratio of surface d4 to surface d2. An abrupt increase of the boosting effect of the booster is achieved by abutment of the guiding projections 15 on the end wall 11.

The operations described will be carried out in reverse direction with declining input force. The pressure member 31 moves in relation to the fixed switching ring 2 in FIG. 1 so far to the right until finally spring 5 will displace the switching ring 2 to the left away from the end wall 11 by way of the second retaining element 6. Thus, the switching ring 2 acts in the direction of the input again and transmits a corresponding counterforce onto the input member 22 by way of spring 5. As a result, the boosting ratio has decreased by an amount corresponding to the growth of the reactive force.

Figure 3:
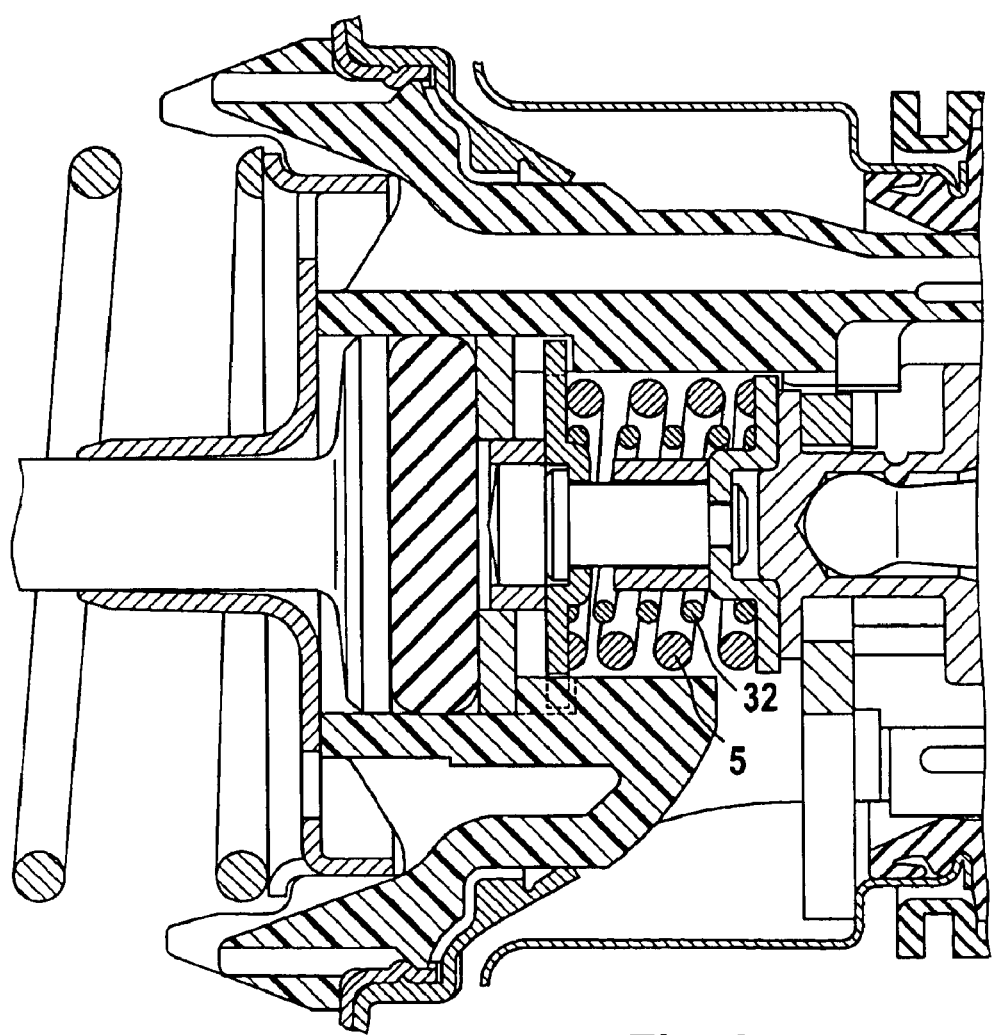
FIG. 3 shows a second embodiment of the invention.

The second embodiment shown in FIG. 3 is only slightly modified compared to the embodiment of FIG. 1. The basic difference is that instead of one spring 5 two parallel connected springs 5 and 32 are used. The internally seated second spring 32 has a lower spring constant compared to first spring 5. This way, a higher spring force that is more precise to proportion can be adjusted in the same space.

What is claimed is:

1. Transmission device for the brake force of a brake force booster with an elastic reaction element, an input member acting on the reaction element by way of an input effective surface, and with an output member acting on the reaction element by way of an output effective surface, with at least part of the force exerted on the output effective surface being taken up by a control housing of the brake force booster, and with modification means being provided that modify the force transmission ratio between input member and output member defined by the ratio of the effective surfaces in dependence on the forces exerted on the reaction element by way of the effective surfaces or the deformation of the reaction element caused hereby, wherein on the input side a part of the surface of the reaction element is supported on the input member by way of a switching ring and by way of a spring element and, with rising force applied to the reaction element, the switching ring is displaced in opposition to the force of the spring element towards a stop on the control housing, makes catch at said stop and thereby decreases the input effective surface.

2. Transmission device as claimed in claim 1, wherein said device is mounted into a controlled brake system wherein in particular the distribution of the brake forces to the individual wheels or wheel groups is controlled in dependence on the slip at the respective wheel or wheels.

3. Transmission device as claimed in claim 1, wherein the spring element is a captivated spring assembly.

4. Transmission device as claimed in claim 3, wherein the spring element includes two spiral springs arranged concentrically relative to each other.

5. Transmission device as claimed in claim 3, wherein the spring assembly includes a spring that is compressed with bias between two movable retaining elements which are limited in their maximum distance to each other by a stop element.

6. Transmission device as claimed in claim 5, wherein the second retaining element includes radial second guiding projections that are axially guided in associated second guiding grooves in the control housing, with end wall of the second guiding grooves forming the axial stop in the control housing.

7. Transmission device as claimed in claim 5, wherein the first of the two retaining elements bears against the input member and forms a projection for the input member, which projection can act on the reaction element and further includes a stop that forms the stop element in relation to the second retaining element.

8. Transmission device as claimed in claim 7, wherein the switching ring is designed as an exchangeable loose component and with its inside peripheral surface is guided by an external peripheral surface of the projection or with its external peripheral surface is guided by the inside peripheral surface of a radial housing projection of the control housing which accommodates part of the forces exerted by the reaction element axially towards the input side.

9. Transmission device as claimed in claim 7, wherein the switching ring is designed as an exchangeable loose component and with its inside peripheral surface is guided by an external peripheral surface of the projection and with its external peripheral surface is guided by the inside peripheral surface of a radial housing projection of the control housing which accommodates part of the forces exerted by the reaction element axially towards the input side.

10. Transmission device as claimed in claim 9, wherein the forces from the reaction element taken up by the switching ring are transmitted from the second retaining element by way of spring onto the first retaining element until the second retaining element abuts on the control housing.

11. Transmission device as claimed in claim 10, wherein the forces directly introduced by the reaction element in the input direction into the control housing are transmitted onto a ring fixed against the control housing in the input direction.

12. Transmission device as claimed in claim 7, wherein the projection is riveted to the first retaining element.

\* \* \* \* \*